United States Patent
Prajapati

(10) Patent No.: US 12,272,178 B2
(45) Date of Patent: Apr. 8, 2025

(54) SIGN LANGUAGE SENTIMENT ANALYSIS

(71) Applicant: MatrixCare, Inc., Bloomington, MN (US)

(72) Inventor: Adhiraj Ganpat Prajapati, St. Paul, MN (US)

(73) Assignee: MatrixCare, Inc., Bloomington, MN (US)

( * ) Notice: Subject to any disclaimer, the term of this patent is extended or adjusted under 35 U.S.C. 154(b) by 425 days.

(21) Appl. No.: 17/804,961

(22) Filed: Jun. 1, 2022

(65) Prior Publication Data
US 2023/0316812 A1 Oct. 5, 2023

Related U.S. Application Data

(60) Provisional application No. 63/362,225, filed on Mar. 31, 2022.

(51) Int. Cl.
*G06V 40/20* (2022.01)
*G06V 10/776* (2022.01)
*G06V 40/16* (2022.01)

(52) U.S. Cl.
CPC ............ *G06V 40/28* (2022.01); *G06V 10/776* (2022.01); *G06V 40/176* (2022.01)

(58) Field of Classification Search
CPC ........... G06V 40/20–28; G06V 40/176; G06V 10/174
See application file for complete search history.

(56) References Cited

U.S. PATENT DOCUMENTS

| | | | |
|---|---|---|---|
| 5,887,069 A * | 3/1999 | Sakou | G06F 18/256 382/209 |
| 10,019,489 B1 * | 7/2018 | Adair | G06V 40/174 |
| 11,972,636 B2 * | 4/2024 | Jain | G06V 40/174 |
| 2014/0112556 A1 * | 4/2014 | Kalinli-Akbacak | G06V 40/176 382/128 |
| 2014/0347263 A1 * | 11/2014 | Dai | G06F 3/0482 345/156 |
| 2016/0098592 A1 * | 4/2016 | Lee | G06F 18/24155 434/236 |
| 2016/0350801 A1 * | 12/2016 | Vincent | G06V 40/20 |
| 2017/0083506 A1 * | 3/2017 | Liu | G06F 40/30 |
| 2017/0308909 A1 * | 10/2017 | Faith | G06V 40/176 |
| 2018/0101520 A1 * | 4/2018 | Fuchizaki | G06F 40/40 |
| 2019/0251702 A1 * | 8/2019 | Chandler | G10L 15/24 |
| 2020/0110927 A1 * | 4/2020 | Shaffer | G06V 40/174 |
| 2020/0126250 A1 * | 4/2020 | Chandler | G06V 40/23 |
| 2021/0150145 A1 * | 5/2021 | Negishi | G06V 10/80 |
| 2021/0358330 A1 * | 11/2021 | Johnson | G10L 13/00 |
| 2022/0036050 A1 * | 2/2022 | Chandler | G06V 40/20 |
| 2022/0130413 A1 * | 4/2022 | Kr | G10L 25/63 |
| 2022/0327309 A1 * | 10/2022 | Carlock | G06F 40/47 |
| 2023/0004738 A1 * | 1/2023 | Wu | G06V 40/176 |
| 2023/0177881 A1 * | 6/2023 | Elwazer | G06T 7/269 382/103 |
| 2023/0316812 A1 * | 10/2023 | Prajapati | G06V 10/82 382/103 |

* cited by examiner

*Primary Examiner* — Sean T Motsinger
(74) *Attorney, Agent, or Firm* — Patterson + Sheridan, LLP

(57) ABSTRACT

A sentiment analysis system is described that uses a machine learning model to predict a mood of an individual based on the motions used by the individual when performing sign language. The present disclosure uses image processing to monitor how a non-verbal individual communicates to, for example, predict overall health and mental well-being.

20 Claims, 12 Drawing Sheets

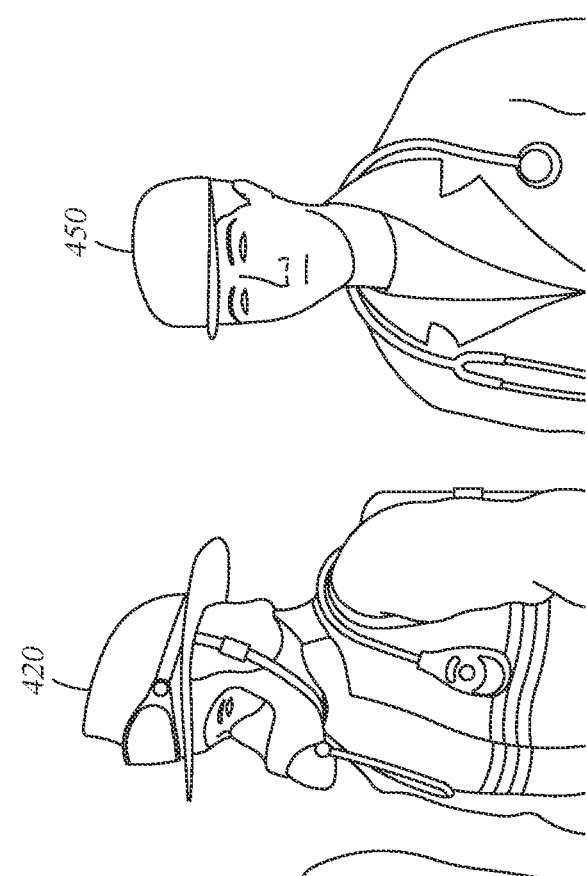
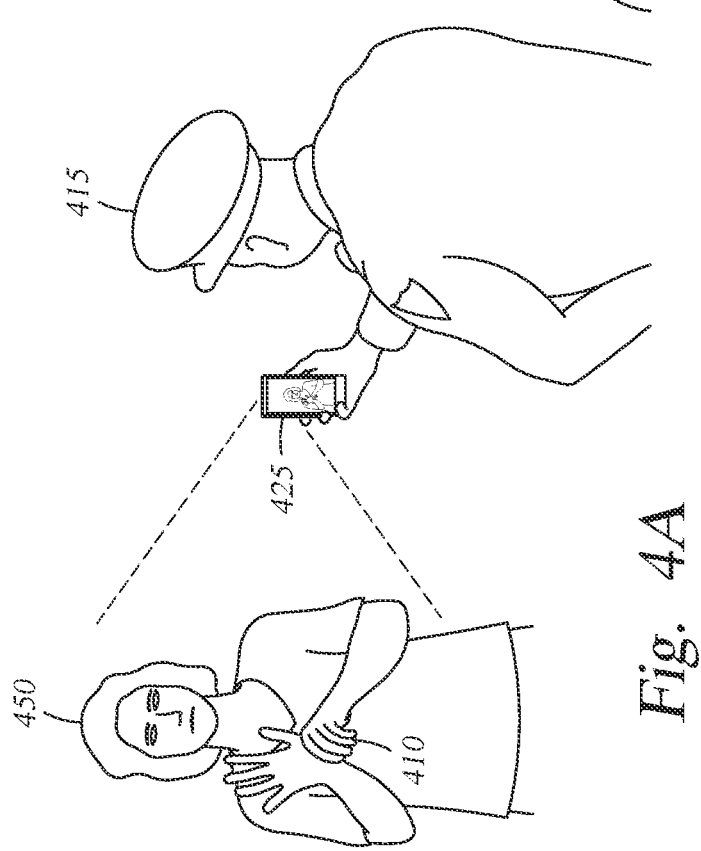
Fig. 4B
Fig. 4A

SIGN LANGUAGE SENTIMENT ANALYSIS

CROSS-REFERENCE TO RELATED APPLICATIONS

This application claims priority to U.S. provisional patent application Ser. No. 63/362,225, filed Mar. 31, 2022. The aforementioned related patent application is herein incorporated by reference in its entirety.

BACKGROUND

Field

Embodiments of the present invention generally relate to sign language sentiment analysis, and more specifically, to analyzing the mood of an individual based on their sign language motions.

Description of the Related Art

In conventional monitoring systems, an individual may be monitored in various settings to determine a mood. Often, the monitoring individual may predict the mood of the individual using their words or phrases. Additionally, the inflection of the words spoken by a monitored individual may be analyzed. However, these conventional approaches do not provide the flexibility to determine moods of those who speak in sign language.

SUMMARY

According to one embodiment of the present disclosure, a method is provided. The method includes capturing, using a camera, a video containing a plurality of sign language motions made by a first individual, predicting, using a trained machine learning (ML) model, a mood of the first individual based on characterizing the plurality of sign language motions in the video, and outputting a second mood based on the mood predicted by the trained ML model.

According to one embodiment of the present disclosure, a system is provided. The system includes one or more computer processors and a memory containing a program which when executed by the one or more computer processors performs an operation. The operation includes capturing, using a camera, a video containing a plurality of sign language motions made by a first individual, predicting, using a trained machine learning (ML) model, a mood of the first individual based on characterizing the plurality of sign language motions in the video, and outputting a second mood based on the mood predicted by the trained ML model.

According to one embodiment of the present disclosure, a non-transitory computer readable medium is provided. The computer product includes instructions to be executed in a processor, the instructions when executed in the processor perform an operation. The operation includes capturing, using a camera, a video containing a plurality of sign language motions made by a first individual, predicting, using a trained machine learning (ML) model, a mood of the first individual based on characterizing the plurality of sign language motions in the video, and outputting a second mood based on the mood predicted by the trained ML model.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

FIG. 4A depicts a fourth example environment, according to one embodiment.

FIG. 4B depicts a user device in FIG. 4A, according to one embodiment.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Embodiments of the present disclosure provide techniques to generate a predicted mood based on sign language motions.

In embodiments of the present disclosure, a machine learning (ML) model predicts a mood of an individual based on the motions used by the individual when performing sign language. The present disclosure uses image processing to monitor how a non-verbal individual communicates to, for example, predict overall health and mental well-being. The conventional approaches only monitor those who speak with auditory words, while the present disclosure monitors those who communicate with sign language. That is, the embodiments herein can evaluate the range of motion of the sign language motions, the speed or acceleration of the individual's hand or hands when making motions, the rate at which the person makes the sign language words or letters, and the like.

The ML model can evaluate the sign language motions to predict the mood of the person such as whether they are angry, in pain, frustrated, excited, happy, and the like. The ML model can be trained using a variety of techniques. For example, the ML model can be based on the persons own sign language motions during a training phase where the person performs sign language motions and then tells the training application their current mood (happy, sad, excited, etc.). From this, the trained ML model can then correlate future sign language motions of the person which a particular mood. In another example, the ML model can be trained using a group of persons who use sign language and report their current emotions in order to generate training data. In one embodiment, the trained ML model can be used with other mood detection techniques that evaluate other mood indicators such as facial gestures, the types of words or phrases being communicated, and the like to predict an overall mood of the person.

Example Environments for the Present Disclosure

Figure 1:
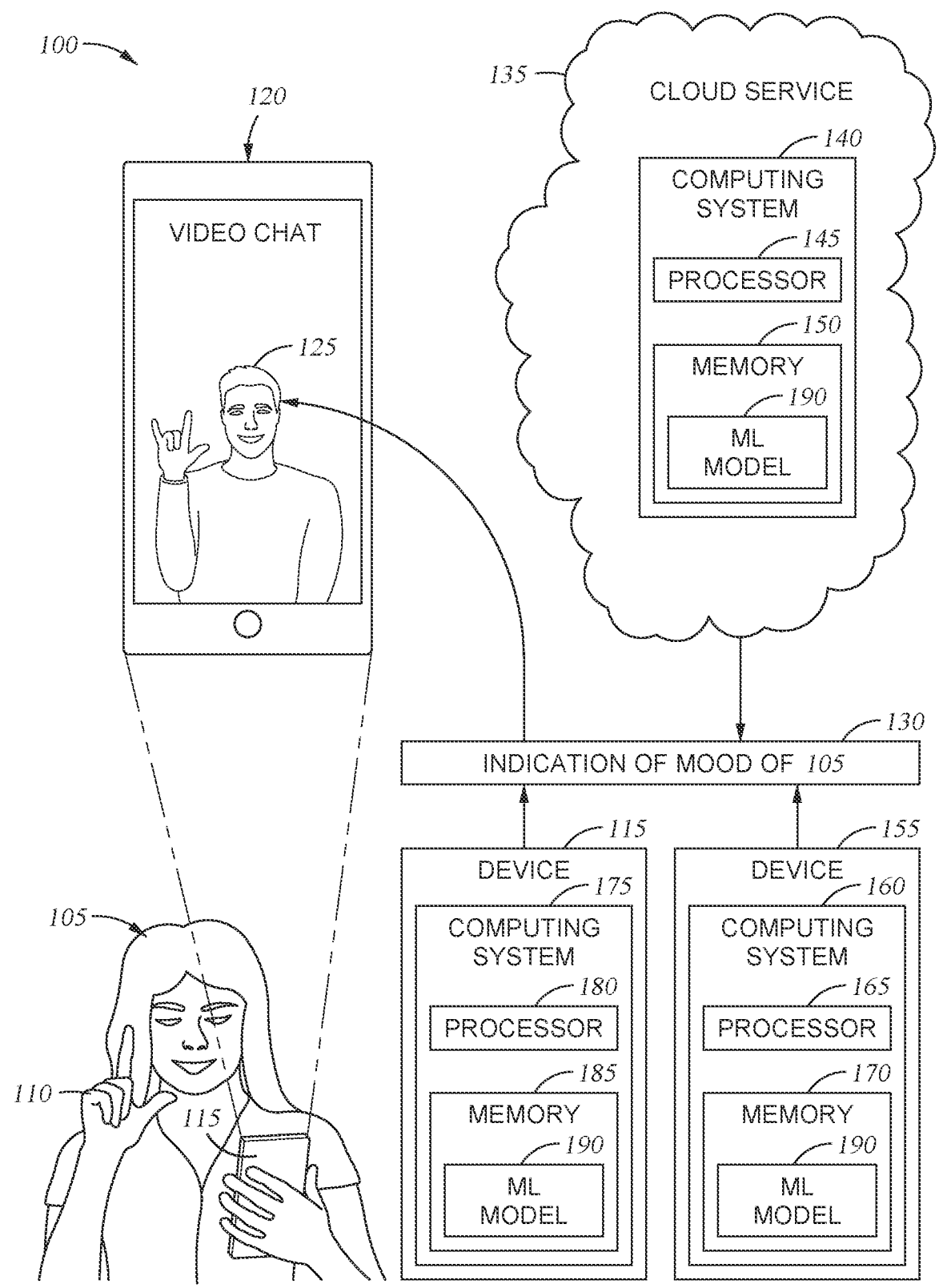
FIG. 1 depicts a first example environment, according to one embodiment.

FIG. 1 depicts a first example environment 100 for the present disclosure. In the illustrated environment 100, a monitored individual 105 is speaking with a monitoring individual 125 over video chat. The monitored individual 105 uses sign language motions 110 to speak to the monitoring individual 125. The sign language motions 110 may indicate a variety of different moods: happiness, sadness, anger, frustration, etc. These moods can be determined based on the types of sign language motions used, the range of movement, general positioning of hands, the speed or acceleration of the hands, and the rate at which the user is communicating the letters, words, or phrases. For example, one individual may sign slowly when depressed and quickly when excited, or may using a large range of motion when excited but a small range of motion when bored.

In one embodiment, the mood of the monitored individual 105 is predicted without performing any analysis on the words or phrases being communicated using the motions 110. That is, the ML model 190 may not need to evaluate whether the person is using words or phrase that imply she is angry or frustrated in order to predict her mood. For example, the ML Model 190 may consider the rate she is communicating words or phrases, but that is independent of the meaning of those words or phrase, e.g., whether they are words or phrases associated with someone who is angry, happy, sad, frustrated, etc. The ML model 190 can predict the mood of the person using the rate she is signing words (as well as other factors such as the range of motions and the speed or acceleration of the hands) without having to interpret or understand the meaning of those words. However, the embodiments herein can be used in combination with other sentiment analysis techniques that do use the meaning of words to predict the mood of the individual.

In one embodiment, the video chat is done over a device 115 such as a smartphone, tablet, or laptop, which has a camera 120. The camera 120 captures the sign language motions 110 of the monitored individual 105. In one embodiment, the device 115 performs sentiment analysis on the sign language motions 110 of the monitored individual 105 to predict or determine the current mood or emotional state of the individual 105.

The device 115 contains a computing system 175 which contains a processor 180 and a memory 185. As discussed in greater detail below, the processor 180 and memory 185 can perform the sentiment analysis on the sign language motions 110 to determine the mood or emotional state of the monitored individual 105. The results of this analysis are output to both the monitored individual 105 and to the monitoring individual 125. For example, the device 115 may inform the monitored individual 105 that she seems sad and can provide suggested actions such as contacting a healthcare professional, taking a walk, calling a family friend, etc. In another example, the device 115 can inform the monitoring individual 125 of the mood or emotional state of the monitored individual 105. For example, the monitoring individual 125 may be a mental health professional where the monitored individual 105 is her patient. In yet another example, the device 115 may provide the mood or emotional state of the monitored individual 105 to someone who is not a part of the video chat shown in FIG. 1. For example, the video chat may be between a patient and her friend, but the mood of the patient detected during the chat can be communicated to a third party such as the patient's doctor or a family member. But in other example discussed below, the sentiment analysis may be performed at other computing systems.

In one embodiment, the monitoring individual 125 has a device 155 such as a smartphone, tablet, or laptop, which can have a camera. In FIG. 1, the monitoring individual 125 is using the device 155 to conduct the video chat with the monitored individual 105. For simplicity, FIG. 1 illustrates the monitoring individual 125 being displayed on the device 115 being held by the monitored individual 105, but it is understood that the device 155 can also have a display on which the monitored individual 105 is shown during the voice chat.

In one embodiment, the device 155 analyzes the sign language motions 110 of monitored individual 105. That is, because the device 155 displays the sign language motions 110 of the monitored individual 105 to the monitoring individual 125, the device 155 can analyze these motions to determine the mood or emotional state of the individual 105. For example, the device 155 may receive the video chat between the monitored and monitoring individuals 105, 125 as input. The device 155 includes a computing system 160 that can analyze the sign language motions 110 and determine a mood of the individual 105. While both the device 115 and the device 155 may analyze the sign language motions 110 to predict the mood of the individual, in one embodiment, only one of these devices 115, 155 predicts the mood. Having the device 155 predict the mood of the individual 105 can be useful, as the monitored individual 105 may not have a device configured to perform sign language sentiment analysis. Further, it may be useful for the monitoring individual 125 to know the mood of the monitored individual 105. For example, the monitoring individual 125 may be a therapist or healthcare worker who may have a device 155 that has been set up with the necessary computing system 160 for performing sentiment analysis on the sign language motions 110.

In another example, the monitoring individual 125 may be a person who is not conversant in sign language. In addition to performing sentiment analysis, the computing system 160 may also perform a translation of the sign language motions 110. That is, the computing system 160 may translate the sign language motions 110 into text that can be read by the monitoring individual 125. The sentiment analysis can then be used to provide context for the text. For example, if the computing system 160 determines the monitoring individual 105 is currently happy, the device 155 can display the text in a bright color to indicate happiness. However, if the computing system 160 determines the monitoring individual 105 is currently angry or frustrated based on the sentiment analysis, the device 155 can display the translated text in a dark red to convey the mood of the monitored individual 105 to the monitoring individual 125. In other example, the device 155 may display additional or supplemental text that states the mood of the monitored individual 105. This text can be updated as the mood of the individual 105 changes during the video chat. In other embodiments, the device 155 could also output audio modulated with the appropriate emotional inflection to match the mood determined by the sentiment analysis. In yet another example, the device 155 can display a face in the background whose expressions are modulated according to the predicted mood.

The computing system 160 in the device 155 includes a processor 165 and a memory 170. The computing system 160 can perform the sentiment analysis for the sign language motions 110 made by the individual 105 as well as other functions. For example, the computing system 160 may translate the motions 110 into text, or perform other types of sentiment analysis on the individual 105 such as monitoring her facial expressions or determining her mood from the types of words she is using. In any case, the output of the sentiment analysis can be provided to the monitoring individual 125.

In another embodiment, the sign language sentiment analysis can be performed in a cloud service 135. The cloud service 135 contains a computing system 140 that includes at least one processor 145 and memory 150. In one embodiment, the device 115 or the device 155 sends images or videos captured during the video chat to the cloud service 135. Using these images or videos, the cloud service 135 performs sign language sentiment analysis to determine the monitored individual's mood. The use of the cloud service 135 allows for the sign language sentiment analysis to be done external to the devices of the monitored and monitoring individuals. That is, rather than requiring the devices 115, 155 to perform the analysis, the analysis can be offloaded onto the cloud service 135, which provides various advantages. For one, a more complicated sign language sentiment analysis can be performed using the cloud service which may have greater compute resources at its disposal than the devices 115 and 155. Another benefit is that compute resources are not being used for the sign language sentiment analysis on the devices 115 and 155. This frees up compute resources in the devices 115 and 155 to be used for other tasks such as video processing, networking tasks, encoding/decoding, or a sign language interpretation application.

One or more of the memories 150, 170, and 185 can contain the ML model 190. That is, the ML model 190 can be stored in one (or more than one) of the memories 150, 170, and 185 in the computing systems 140, 160, and 175. The ML model 190 may be used in sign language sentiment analysis. In one embodiment, the ML model 190 is trained to recognize what sign language motions 110 are associated with various moods. For example, the ML model 190 is trained to understand that slow movements are tied to an individual being sad. Using the trained ML model 190 leads to improved accuracy in analyzing an individual's sign language motions 110 and tying them to associated moods.

In embodiments, the ML model 190 may include a neural network such as a Region-based Convolutional Neural Networks (R-CNN), Fast R-CNN, Faster R-CNN, or Mask R-CNN, a Region-based Fully Convolutional Network (R-FCN), Histogram of Oriented Gradients (HOG), Spatial Pyramid Pooling (SPP-net), Single Shot Detector (SSD), You Only Look Once (YOLO), or Blitznet. However, these types of ML algorithms are not to be construed as limiting, as other suitable ML algorithms may be used.

There are various scenarios in which the system illustrated in FIG. 1 may be used. For example, a mother could be talking with her son, who is also her caregiver. Her son may be physically distant from his mother but needs to understand her mood in order to be a successful caregiver. Her son would benefit from using this system, as he may not be able to tell what her mood is. Her son can then rely on the sentiment analysis completed by the system for her sign language motions to determine her mood. As an example, if she is sad, he may decide to take an action like sending her flowers or scheduling a trip to come see her.

As another example, a hearing impaired patient may be communicating with her doctor using sign language. The doctor may not know her mood only based on the words she is signing or on her facial expressions. The doctor would benefit from knowing her mood as inferred from the sign language motions, as this may inform the best care plan needed for the patient. Using this system, the doctor can understand the patient's mood. For example, the patient may be in pain, and her sign language motions may indicate that she is in pain. The doctor, through using the system, will then understand her patient is in pain and is in need of medication.

As yet another example, a first individual may be video chatting with a second individual whom they have not spoken with before. The second individual can benefit from knowing what the mood or emotional state of the first individual based on the ML model 190 monitoring the sign language motions 110. For example, the second individual may not know that an individual is angry based on the actual words of the conversation, but the first individual's sign language motions indicate that the individual is angry. Using this system, the second individual can alter the manner in which she is speaking to address the first individual's anger.

Figure 2:
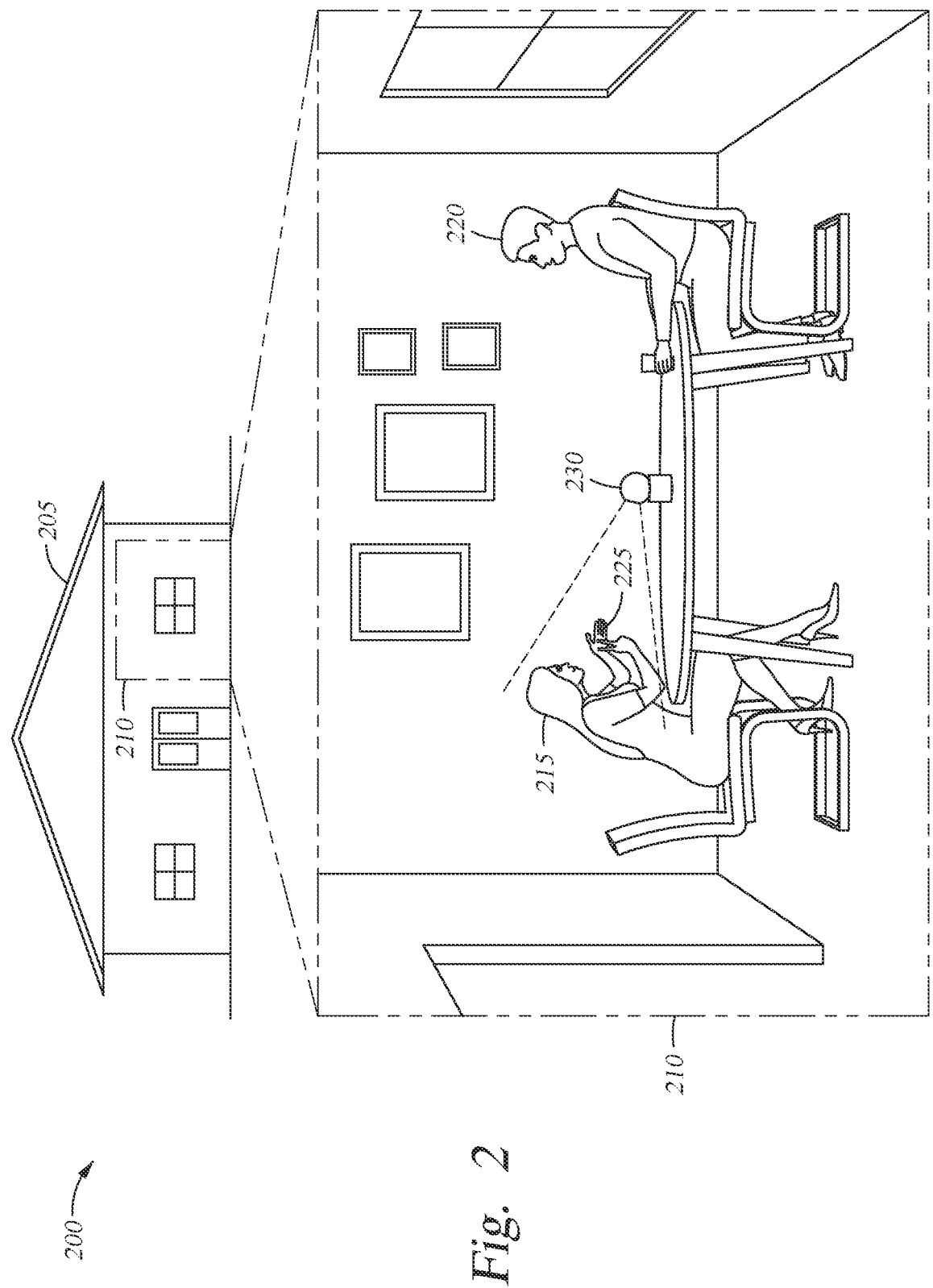
FIG. 2 depicts a second example environment, according to one embodiment.

FIG. 2 depicts a second example environment for the present disclosure. In the illustrated environment 200, a monitored individual 215 is speaking with a monitoring individual 220 in a section 210 of a home 205. The monitored individual 215 uses sign language motions 225 to speak to the monitoring individual 220. The sign language motions 225 may indicate a variety of different moods: happiness, sadness, anger, frustration, etc. These moods can be determined based on the types of motions used, as discussed above.

In one embodiment, the sign language motions 225 are monitored by the camera 230. The camera 230 may be a home-security device or may be a component of a user's smartphone, a user's tablet, or a user's laptop. Using the components outlined in FIG. 1, the monitored sign language motions are analyzed (e.g., using one of the computer systems described in FIG. 1) to determine a mood of the monitored individual 215. The camera 230 provides images or video of the sign language motions to the computing system. The computing system may be located on a monitored individual's device, a monitoring individual's device, or a cloud service. The computing system uses the input of the images and video from the camera 230 as input to a ML model (e.g., the ML model 190 in FIG. 1) to determine a sentiment or mood of the monitored individual 215.

After the mood is determined, the mood is transmitted to the monitoring individual 220. In one embodiment, the mood is transmitted by displaying an indication of the mood on the monitoring individual's device. For example, the individual's device may have a software application that displays the determined mood of the monitored individual 215. In another embodiment, the mood is transmitted from the cloud service to the monitored individual's device. For example, if the monitored individual's device is a laptop sitting on a table in the room where the two individuals are speaking, the device may display the mood of the monitored individual for the monitoring individual 220 to view.

For example, the monitoring individual 220 may be a healthcare provider talking with the monitored individual 215 in her home. The monitoring individual 220 may be alerted over her device that the monitored individual 215 is signing in a manner that indicates she is in pain or is sad. Using this indication, along with the actual words being expressed by the individual 215, the healthcare provider can change the care she is providing or give a new medication to assist with the monitored individual's condition.

Figure 3:
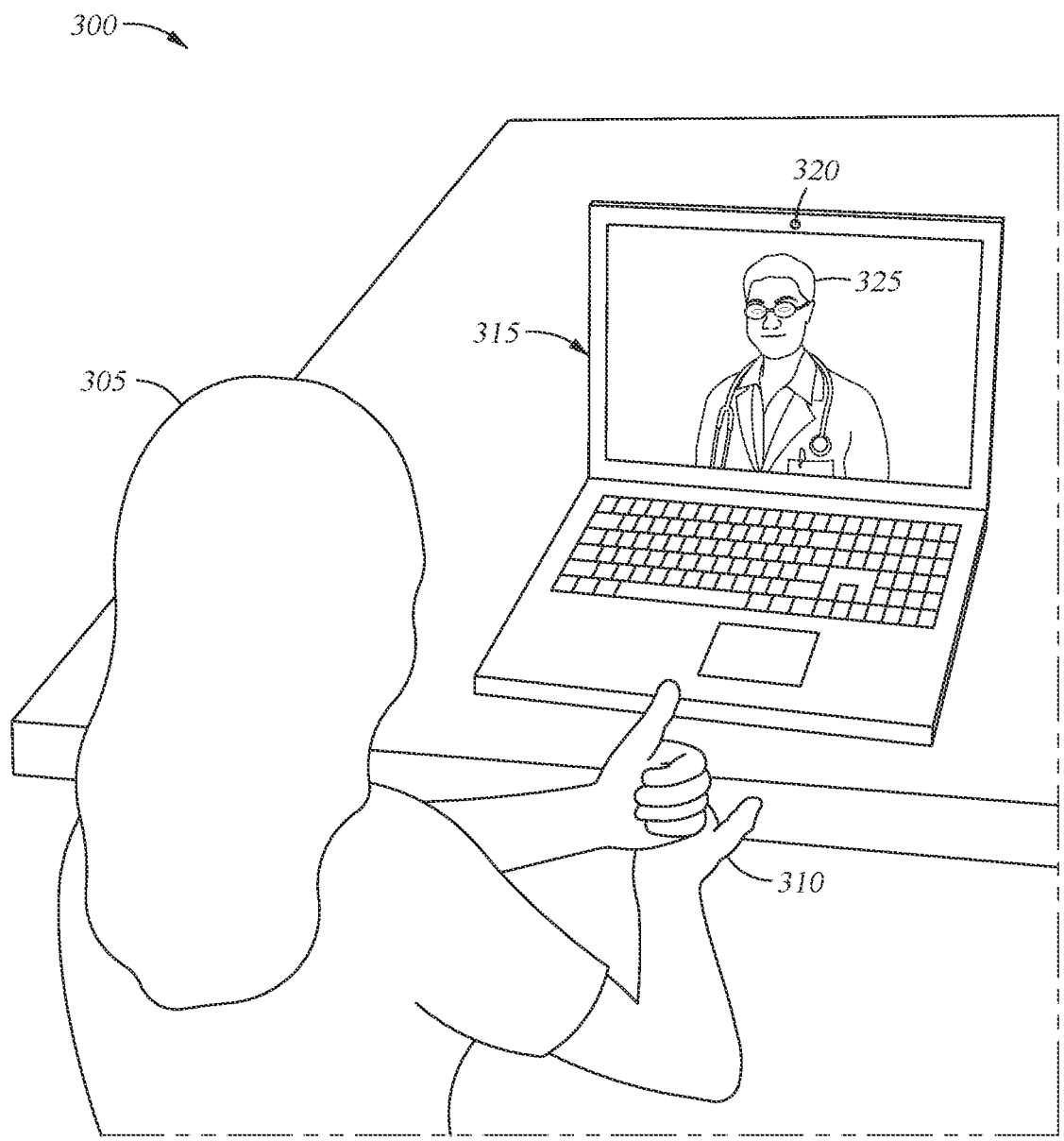
FIG. 3 depicts a third example environment, according to one embodiment.

FIG. 3 depicts a third example environment for the present disclosure. In the illustrated environment 300, a patient 305 is speaking with a healthcare provider 325 over a device 315 for a telehealth appointment. The device 315, which may be a smartphone, tablet, or laptop, uses a camera 320 to monitor the patient 305. The patient 305 uses sign language motions 310 to speak to the healthcare provider 325. The sign language motions 310 may indicate a variety of different moods: happiness, sadness, anger, frustration, etc. These moods can be determined based on the types of motions used as discussed above.

In one embodiment, the sign language motions 310 are monitored by the camera 320 on the device 315 (e.g., the patient's smartphone, tablet, or laptop). Using the components outlined in FIG. 1, the monitored sign language motions are analyzed to determine a mood of the patient 305. The camera 320 provides an input of images or video to the computing system which then performs the sentiment analysis. The computing system may be located on the patient's device 315, a healthcare provider's device, or a cloud service. The computing system uses the input of the images and video from the camera 320 to determine a sentiment or mood of a patient.

After the mood is determined, the mood is transmitted to the healthcare provider 325. In one embodiment, the mood is transmitted by displaying an indication of the mood on the healthcare provider's device. For example, the healthcare provider's device may have a software application that displays the determined mood of the patient.

For example, the healthcare provider may be alerted by her device after performing sentiment analysis that the monitored individual is signing in a manner that indicates she is anxious. Using this indication, along with the actual words being expressed by the patient 305, the healthcare provider can change the care she is providing or give a new medication to assist with the patient's anxiety.

FIG. 4A depicts a fourth example environment for the present disclosure. In the illustrated environment 400, a distressed individual 405 is communicating with various first responders 415, 420, and 450 using sign language. These first responders may be members of the police department, members of the fire department, emergency medical technicians (EMTs), and the like. As illustrated, the first responder 415 is holding a device 425, which may be a smartphone, tablet, or laptop. As shown in FIG. 4B, the device 425 uses a camera 430 to monitor the distressed individual 405. The distressed individual 405 uses sign language motions 410 to speak to the various first responders 415, 420, and 450. The sign language motions 410 may indicate a variety of different moods: happiness, sadness, anger, frustration, etc. Using the present disclosure, the techniques provided can monitor the distressed individual 405 and determine that, e.g., frantic motions indicate she is in pain.

Using the components outlined in FIG. 1, the monitored sign language motions are analyzed to determine a mood of the distressed individual 405. The camera 430 provides an input of images or video to the computing system that performs the sentiment analysis. The computing system may be located on a first responder's device 425 or a cloud service. The computing system uses the input of the images and video from the camera 430 to determine a sentiment or mood of a distressed individual.

In one embodiment, the determined mood is displayed on the device 425 to enable the first responder to address the distressed individual's issues. For example, the first responder's device may display the distressed individual's mood that they are in pain, allowing for the first responder to provide medical support.

In one embodiment, the sign language sentiment analysis is used in conjunction with a software application already on the first responder's device 425 which translates sign language into plain text. For example, the first responders may be unable to interpret sign language or have little experience communication with a person who using sign language, but this software application provides a translation of the sign language into plain text so the responders can understand the individual 405. Using the current software application in conjunction with the sign language sentiment analysis, the first responder is not only able to understand the words that the distressed individual is using, but also the mood or emotional state of the distressed individual. This assists the first responder in evaluating the situation and addressing it in the best way. In this embodiment, the first responder can understand what the individual is saying and also whether the distressed individual is in pain, scared, frustrated, angry, etc.

Flow Diagram Illustrating a Method for Sign Language Sentiment Analysis

Figure 5:
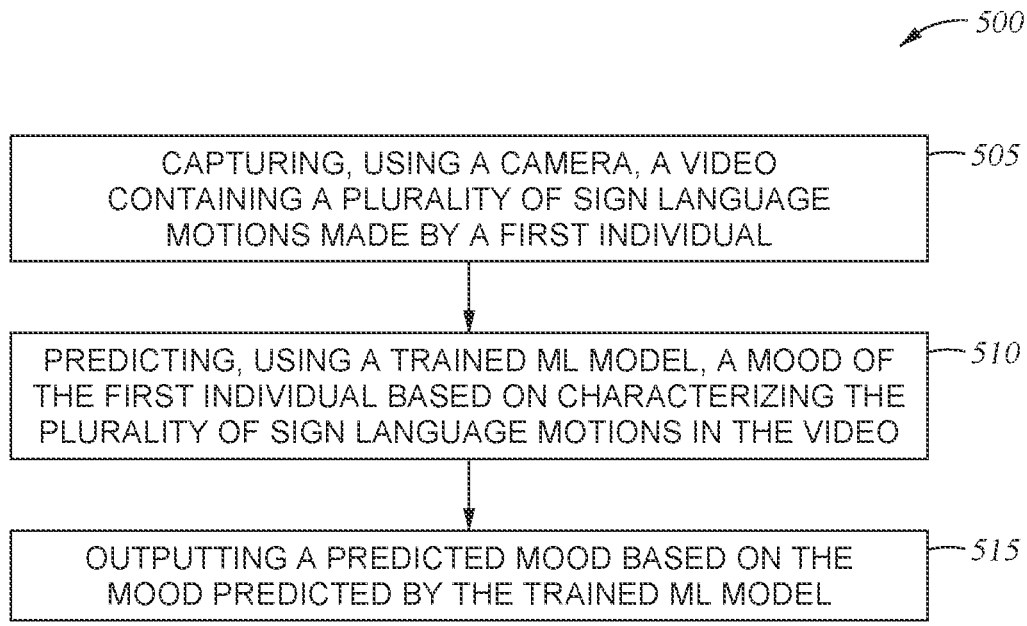
FIG. 5 is a flow diagram for sign language sentiment analysis, according to one embodiment.

FIG. 5 is a flow diagram illustrating a method for sign language sentiment analysis. At block 505, a camera captures a video containing a plurality of sign language motions made by a first individual. The video can be captured during any of the scenarios discussed above in FIGS. 1-4A. Further, the camera can be part of a user device, a home monitoring system, a healthcare monitoring system, and the like.

In one embodiment, a video processing application pre-processes the video to identify the range of motion of the sign language motions, the speed of the person's hands when signing, or the rate at which the person forms letters, words, or phrases using the sign language motions.

At block 510, a trained ML model predicts a mood of the first individual based on characterizing the plurality of sign language motions in the video. In one embodiment, the video is a direct input into the ML model. For example, the ML model may be trained to correlate the various sign language motions to different moods of the individual.

In another example, the metrics determined by the video processing application (e.g., range of motion, the speed of the person's hands, or the rate at which the person forms letters, words, or phrases) are input into the ML model, but the video is not. In this case, the ML model can use these metric to predict the mood of the individual.

The details for training the ML model as discussed in FIGS. 6-9 below.

At block 515, the computing system outputs a predicted mood based on the mood predicted by the trained ML model. In one embodiment, the mood predicted by the ML model is directly output to a user. For example, during a video chat, the mood predicted by the ML model can be displayed to the other participant in the chat. Or the mood may be sent to a close friend or therapist who may not be currently communicating with the individual. Further examples of using the mood predicted by the ML model were discussed in FIGS. 1-4.

In another embodiment, the mood predicted by the ML model can be combined with other sentiment analysis techniques to result in an overall predicted mood, which is then output to a user. This is discussed in FIG. 11 where facial expression analysis and word use analysis can be used in combination with the ML model to generate an overall predicted mood. Moreover, comparing the mood predicted by the ML model with the moods predicted using a different sentiment analysis technique can be used to determine when to recalibrate the ML model, which is discussed in more detail in FIG. 12.

Flow Diagram Illustrating a Method for Sign Language Sentiment Analysis

Figure 6:
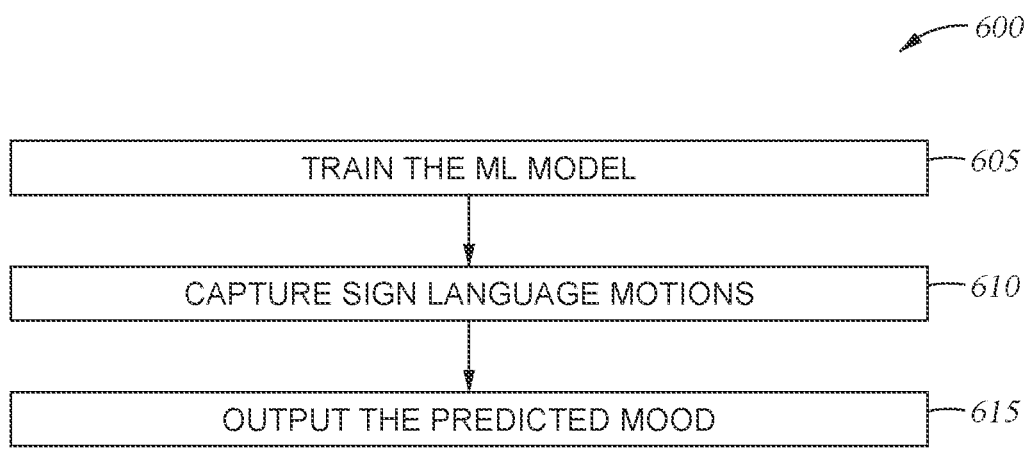
FIG. 6 is a flow diagram for sign language sentiment analysis, according to one embodiment.

FIG. 6 is a flow diagram illustrating a method for sign language sentiment analysis. At block 605, a training application trains an ML model (e.g., the ML model 190 in FIG. 1). There are various ways for training the ML model. In one embodiment, the ML model is trained using a test group which can perform sign language and indicate their current mood or emotional state. This can be used to form training data to train the ML model to correlate specific sign language motions with a particular mood or emotional state. For example, in general, the members of the test group may sign words quickly when excited but sign more slowly when sad or depressed. This labeled training data can be used to train the ML model which can then be deployed to perform sentiment analysis for people who were not part of the test group. This is explained in further detail with reference to FIG. 7.

In another example, the ML model is trained using training data derived from a particular user. For example, when installing a sentiment analysis application on a user device or when first using a sentiment analysis application in a cloud service, the application may initiate a calibration or training period where it asks the user to perform sign language and records their current mood or emotional state. This can be used to create labeled training data to train the ML model to recognize the mood of the user. This is explained in further detail with reference to FIG. 8.

At block 610, the sign language motions of an individual are captured. In one embodiment, a camera is used to capture the sign language motions. This camera can be part of a portable device (e.g., smartphone, laptop, tablet, etc.), webcam, a home security system, home monitoring system, a video monitoring system in a healthcare facility or doctor's office, and the like. The motions can be captured during many of the interactions described in FIGS. 1-4A such as a video chat, online therapy session, in-person communication, and the like. However, these are not intended to be an exhaustive list of scenarios where the embodiments herein can be used.

The camera can capture a video file that is then sent to a computing system for processing. The video file can be used for other purposes besides performing sentiment analysis on sign language motions. For example, a computing system could also perform a translation of the sign language into text or evaluate the facial expressions of the person to determine their current mood. As such, the sentiment analysis described herein can be combined and used in applications that perform other functions (e.g., translations) as well as using different techniques to perform sentiment analysis.

The video captured by the camera (or multiple cameras) can be provided to the trained ML model to predict a mood of the person based on the sign language motions. Before inputting data into the ML model, in one embodiment, the video may be processed to first classify the types of motions in the video. For example, a video processing application may evaluate the video to identify the range of motion, the speed of the person's hands when signing, or the rate at which the person is making letters, words, or phrases. That is, instead of transmitting the raw video to the ML model, the video application may quantify the sign language motion into metrics (e.g., range of motion, speed, rate, etc.) which are then input into the ML model. However, in other embodiments, the ML model may be able to receive the video as a direct input.

At block 615, the ML model outputs a predicted mood of the person. The predicted mood can be an emotion such happy, sad, angry, etc. or the predicted mood can be an emotional state such as anxious, depressed, worried, and the like. The predicted mood can be transmitted to the person making the sign language motions (as a way to provide them with feedback such as "This conversation appears to be making you angry" or "You seem to be sad today, I suggest you go for a walk outside). The method 600 can be a treatment that identifies the mood of the person and provides suggestions to help them progress from a negative mood to a positive mood.

In another embodiment, the computing system can transmit the predicted mood to a second person who is communicating with person performing the sign language motions. The second person can use the predicted mood to "read between the lines" of the conversation. For example, the words signed by the person may be neutral or even positive, but the actual sign language motions may indicate the person is actually sad or depressed. For example, the second person may ask the hearing impaired person "How are you feeling today?" and get a reply, using sign language, of "Pretty good." The ML model can predict based on the motions used when signing "Pretty good" that the person is actually sad or depressed. This mood can then be displayed to the second person, who may be a concerned family member, a medical professional, or a first responder.

In another embodiment, the computing system can transmit the predicted mood to a third-party who is not currently communicating with the person who is signing. For example, the computing system may be used as an alerting system to inform the third-party when the person has a unhealthy mood. The third-party may be a family member or a medical professional. Thus, even when the third-party is not currently communicating with the person, the third-party can be informed of the predicted mood as the person communicates using sign language with other individuals.

Flow Diagram Illustrating a Method for Generating a Baseline for a Test Group

Figure 7:
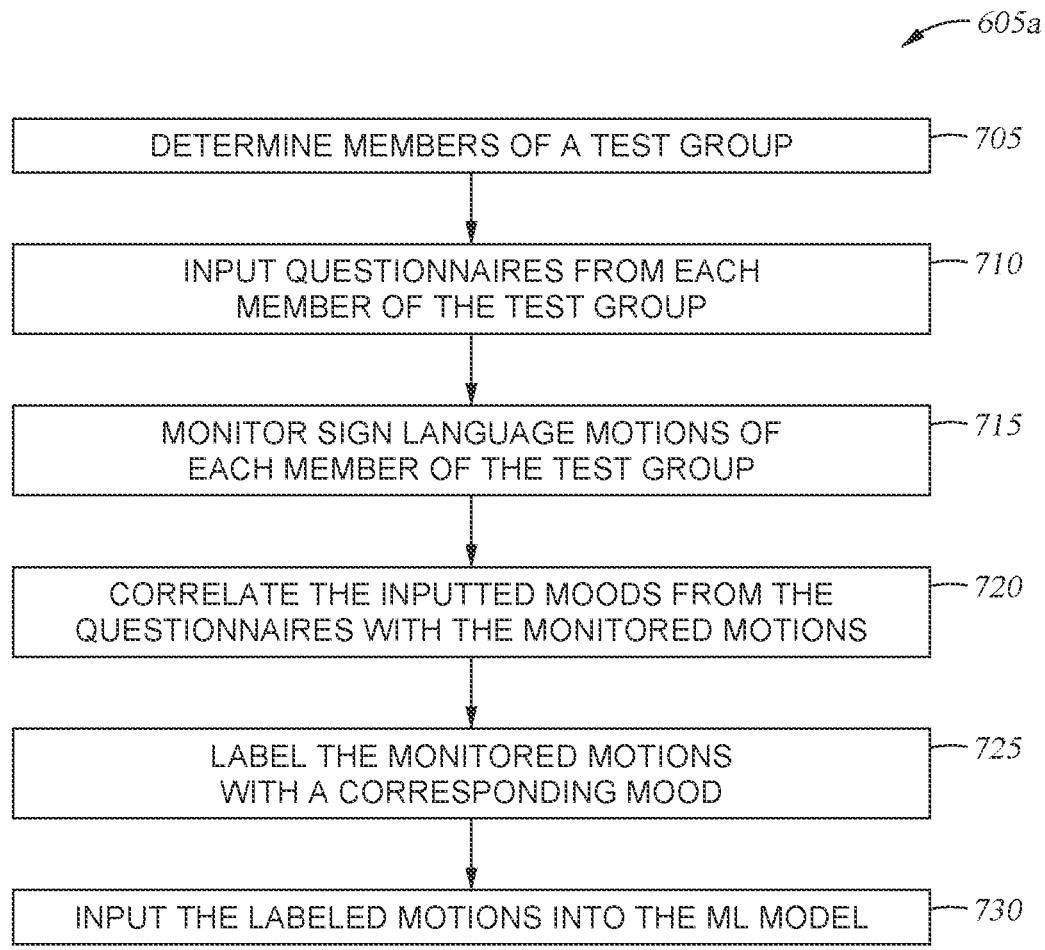
FIG. 7 is a flow diagram for generating a baseline for a test group, according to one embodiment.

FIG. 7 is a flow diagram illustrating a method 605a for generating a baseline for a test group. The method 605a of FIG. 7 is one potential method for training the ML model, which takes place at block 605 in FIG. 6. The method 605a begins at block 705.

At block 705, members of a test group are determined. These test group members are monitored to generate a baseline for the ML model. In one embodiment, the test group members are asked to fill out a questionnaire. This questionnaire includes questions related to the individual's current mood. For example, the questionnaire may seek to identify the current mood or emotional state of the member of the test group: are they sad, happy, excited, bored, etc.

At block 710, the questionnaires filled out by each of the test group members is inputted into a system. For example, one test group member indicates he is in a sad mood while another test group member indicates she is in a happy mood. At block 715, the sign language motions of each test group member are monitored during a time close to when they filled out the questionnaire. That way, the sign language motions can be correlated to the current mood or emotional state of the members as discovered by completing the questionnaire. For example, the first test group member signs slowly or uses a small range of motion when sad, while the second test group member signs quickly or uses a medium range of motion when happy.

At block 720, the inputted moods from the questionnaires are correlated with the monitored motions. For example, the system may monitor the sign language motions used by the members in the test group for a particular time frame (e.g., for five minutes). The method 605a may ask the test group to answer specific questions during the time frame so the system can record their sign language motions when answering those questions.

At block 725, the monitored motions are labelled with a corresponding mood. Using the example above, the man indicated he was in a sad mood and signed slowly. The woman indicated she was in a happy mood and signed quickly. The video capturing the sign language motions of the man can be labelled as motions correlating to being sad while the video capturing the sign language motions of the woman can be labelled as motions correlating to being happy. By correlating and labelling these motions, it can be further understood what an individual's mood is based on the way the individual is signing.

Further, it may be that some members of the test group are outliers where they, for example, use a large range of sign language motions, or sign at a very fast rate when bored while the majority of the members of the test group use a small range of motion and sign at a slow rate when bored. If the test group is large enough, the outliers can be identified and compensated for by the ML model.

The labelled videos can then be used as training data for the ML model. In one embodiment, the labelled videos can be directly input into the ML model, but in other embodiments the labelled videos may be pre-processed by a video processing application to identify the range of motion, the speed of the person's hands when signing, or the rate at which the person is making letters, words, or phrases. That is, instead of transmitting the labelled video to the ML model, the video application may quantify the sign language motion into metrics (e.g., range of motion, speed, rate, etc.) which are then labelled with the moods or emotions identified by the questionnaire.

At block 730, the labelled motions are inputted into the ML model which can then perform a training process to correlate sign language motions to moods. This generation of a test group baseline is one way that block 605 from FIG. 6 may be performed.

Figure 8:
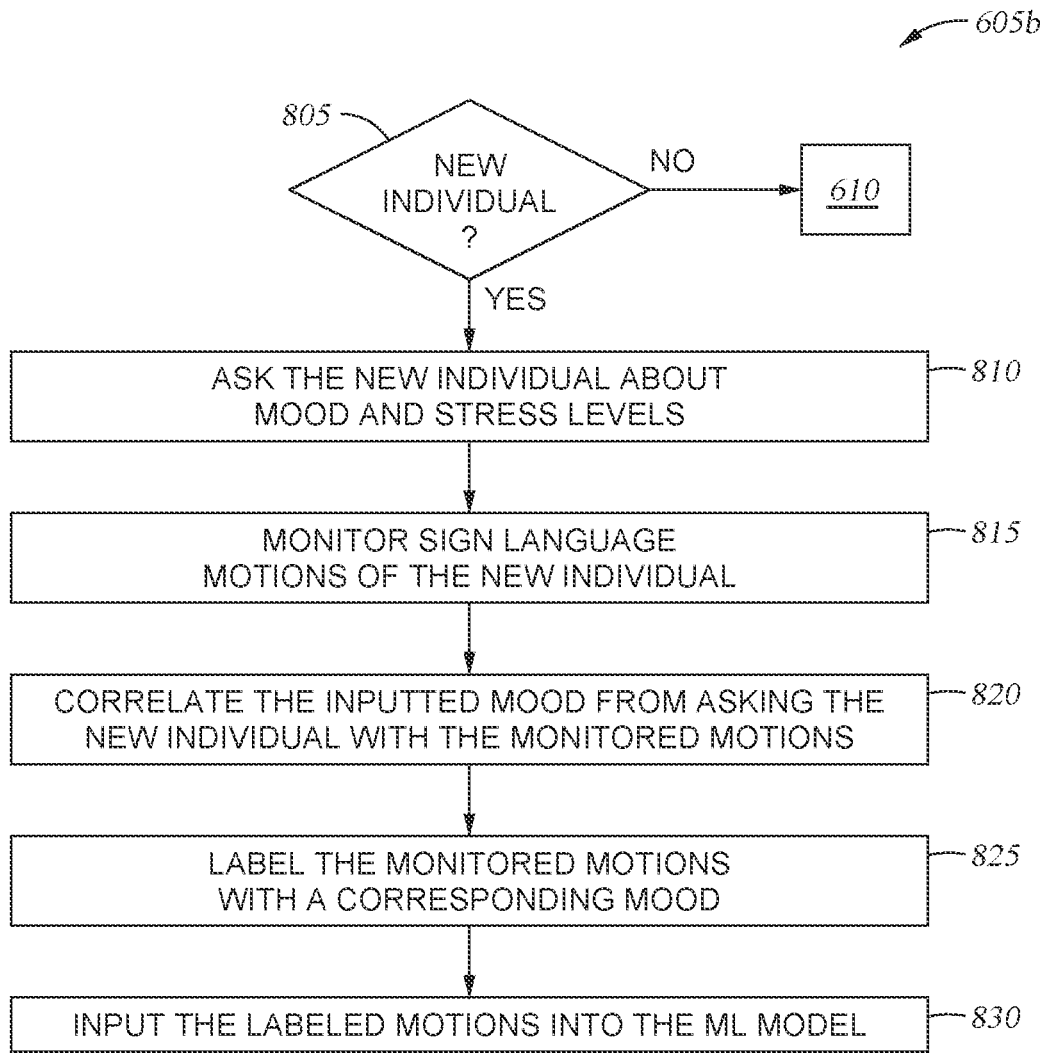
FIG. 8 is a flow diagram for generating a baseline for a new individual, according to one embodiment.

Flow Diagram Illustrating a Method for Generating a Baseline for a New Individual FIG. 8 is a flow diagram illustrating a method for generating a baseline for a new individual. The method 605b of FIG. 8 is one potential method for training the ML model, which occurs at block 605 in FIG. 6. The method 605b begins at block 805.

At block 805, the training application determines whether a new individual is being monitored for training. For example, the method 605b may begin when the individual first purchases an application or service for monitoring the individual's sign language motions. In another example, the method 605b may begin when the individual registers with a new healthcare practice as a new patient. For example, the healthcare practice may ask the patient to perform the method 605b in order to train an ML model to predict the patient's moods. As mentioned above, this can be used by the healthcare practice to provide care to the patient.

In one embodiment, the method 605b is part of a initialization phase of a software application or service that predicts the individual's mood. Predicting mood based on sign language motions can be just one technique used by the software application or service. The application or service can also use other techniques such as monitoring facial expressions or determining mood from the words or phrases used by the individual.

If the individual and her information have already been used to train the ML model, there is no need to continue with training again for that individual. If this is the case, the method 605b ends and moves to block 610 of FIG. 6. However, if it is a new individual that has not been monitored before, the method 605b proceeds to block 810.

At block 810, the training application asks the new individual about her mood and stress levels. For example, she may indicate she is in pain. In one embodiment, the training application can provide a questionnaire like the one described in FIG. 7 to determine or identify the current mood of the individual.

At block 815, the training application monitors the sign language motions of the individual. This can be done using one or more cameras, such as a camera in a user device (e.g., smartphone, tablet, laptop), webcams, or a home monitoring system. The video from the camera can be then be provided to the training application. In one embodiment, the training application may ask specific questions which the individual answers using sign language while the camera records the motions.

At block 820, the training application correlates the inputted mood with the monitored motions. At block 825, the training application labels the monitored motions with a corresponding mood. For example, if the individual reported she was happy, then the sign language motions made by the user can be correlated with being happy. Thus, the video capturing the sign language motions of the individual can be labelled as motions correlating to being happy. By correlating and labelling these motions, it can be further understood what an individual's mood is based on the way she is signing.

Block 825 may occur over several different times, such as over several different days. That way, the training application is more likely to obtain video capturing motions that are correlated to different moods of the individual. For example, the training application may capture sign language motions on Day 1 when the individual is happy but capture sign language motions on Day 2 when the individual is bored. Notably, while it may be better to capture sign language motions for all the moods, this is not a requirement. The ML model can infer different moods even when there is no training data for the individual that correlates to that mood. For example, the method 605b can be used in combination with the method 605a where training data is gathered from a test group. This training data derived from the test group may include sign language motions correlated to other moods which can be used to predict when the individual has those moods.

The labelled videos can then be used as training data for the ML model. In one embodiment, the labelled videos can be directly input in to the ML model, but in other embodiments the labelled videos may be pre-processed by a video processing application to identify the range of motion, the speed of the individual's hands when signing, or the rate at which the individual is making letters, words, or phrases. That is, instead of transmitting the labelled video to the ML model, the video application may quantify the sign language motion into metrics (e.g., range of motion, speed, rate, etc.) which are then labelled with the moods or stress levels identified at block 810.

At block 830, the training application inputs the labelled motions into the ML model which then performs a training process to correlate sign language motions to moods. This generation of a baseline for a new individual is just one way that block 605 from FIG. 6 may be performed.

Workflow for Weighing Various Inputs when Training an ML Model

Figure 9:
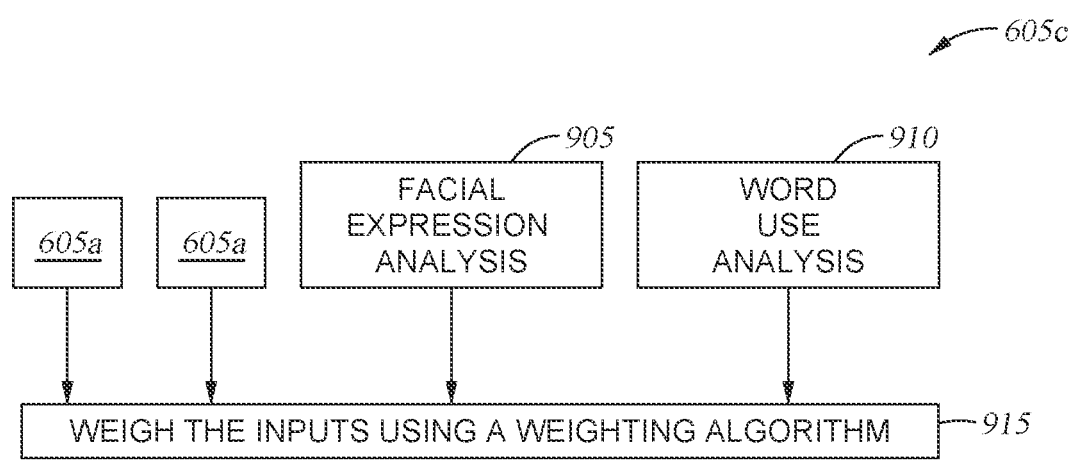
FIG. 9 is an example workflow for weighing various inputs when training a machine learning model, according to one embodiment.

FIG. 9 is an example workflow for weighing various inputs when training a ML model. The workflow 605c of FIG. 9 is one potential method for training the ML model, which takes place at block 605 in FIG. 6. The workflow 605c may work in conjunction with methods 605a and 605b.

Current techniques exist for monitoring individuals' facial expressions to determine their mood. Additionally, there are techniques for monitoring an individuals' word use to determine their moods. These current techniques may be used in conjunction with sign language sentiment analysis in order to further train an ML model.

Any of the following may be inputted into a weighting algorithm: labelled motions from method 605a, labelled motions from method 605b, facial expression analysis 905, and word use analysis 910. To provide a weighted input, at least two of the inputs are used.

At block 915, the inputs are weighed using a weighting algorithm. This weighting algorithm is pre-configured to weight the inputs. For example, the words used by those included in the training group may be associated with a happy mood. However, the facial expressions used by the training group may be associated with a sad mood. This weighting algorithm can account for these types of scenarios where the different inputs do not match up as expected. The weighting algorithm can balance out the inputs and train the ML model with the weighted inputs.

After the weighting algorithm is applied to train the ML model, the workflow moves to block 610 of FIG. 6.

Figure 10:
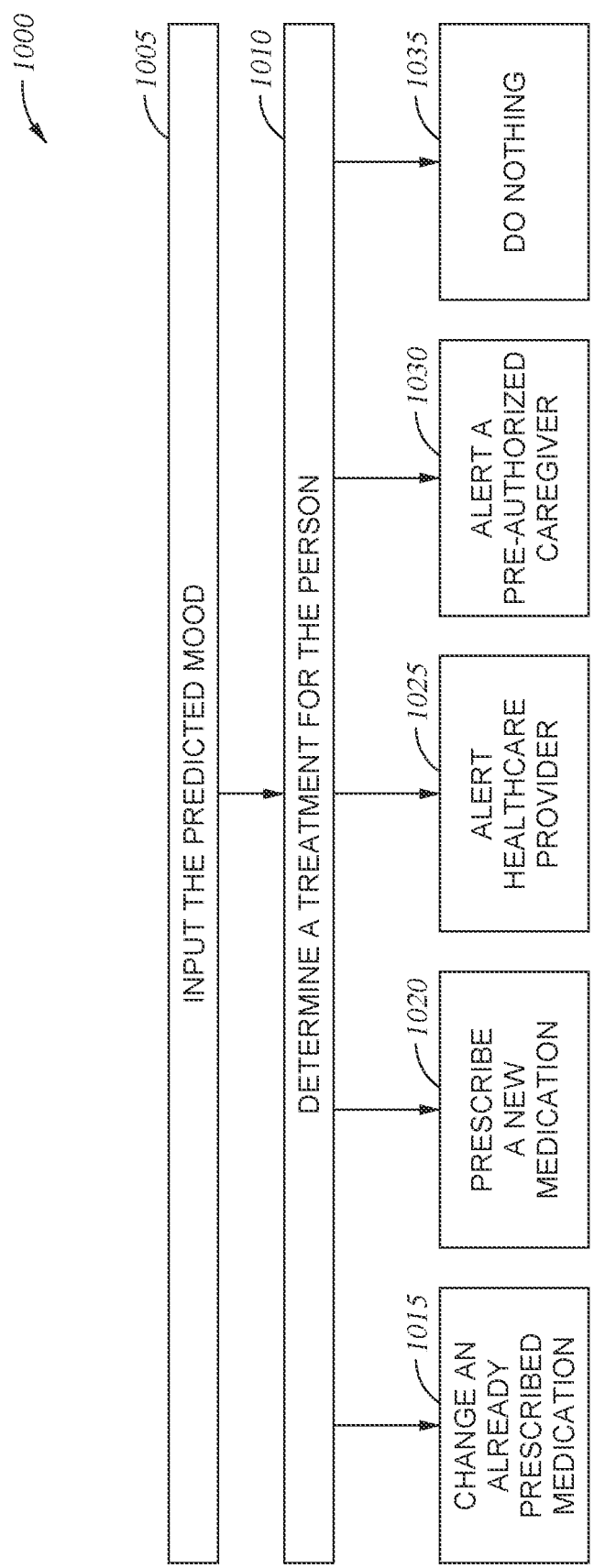
FIG. 10 is a flow diagram for determining a treatment for an individual, according to one embodiment.

Flow Diagram Illustrating a Method for Determining a Treatment for an Individual FIG. 10 is a flow diagram illustrating a method for determining a treatment for an individual. The inputted predicted mood at block 1005 may correspond to the predicted mood output at block 615 of FIG. 6. This predicted mood is used to determine a treatment.

At block 1010, a treatment is determined using the predicted mood. For example, a patient may be communicating with her healthcare provider over a telehealth appointment, as discussed in FIG. 3. After monitoring her sign language motions, it is determined that she is in distress from the current medication she is taking. Based on this analysis, the healthcare provider may change the currently prescribed medication, as in block 1015. For example, the mood predicted by the ML model may not match, or even may contradict, what the patient signs to the healthcare provider. The patient may say she is fine, but the ML model may predict the patient is sad. The healthcare provider can use this to ask more probing question to get to the truth and eventually adjust the prescribed medication.

As another example, after monitoring her sign language motions, it is determined that a patient is in pain. For example, the patient may not want to admit to the healthcare professional that she is in significant pain. If the patient is not currently taking any pain medications, the healthcare provider may prescribe a new medication to the patient to address the pain, as in block 1020.

In one embodiment, for example, an individual is in her home, as in FIG. 2. Her sign language motions are frantic, and the words she is using indicate she is in pain. Based on this analysis, at block 1025, a healthcare provider is alerted. In one embodiment, the ML model may output a severity of the pain (or the particular mood) such as: mild discomfort, discomfort, and severe pain. The healthcare provider may not be alerted until the ML model predicts the patient is having severe pain, instead of mild discomfort. In another example, the ML model may generate an output that can distinguish between when the patient is simply sad or is depressed. The healthcare provider may be alerted if the patient is depressed, but not when they are sad.

As another example, an individual is in her home and is signing very slowly and has a sad face. Based on this analysis, a pre-authorized caregiver should be alerted, as in block 1030. The pre-authorized caregiver can be a therapist, a friend, or guardian. Like above, when to alert the caregiver can depend on the severity of the mood or the emotion. If the patient is merely sad (but not depressed), the caregiver is not alerted. In one embodiment, the alerting system may also consider the length of time the patient is in the emotional state when alerting the caregiver. For example, if ML model determines the patient has been sad for over three days, the caregiver is alerted. In one embodiment, the alerting system can use a tier alerting system. For instance, if the patient is said for an entire day, the system alerts a family member or friend. If the patient remains sad for three days, the system alerts a healthcare provider.

In one embodiment, for example, an individual is talking to a friend over video chat, as in FIG. 1. Her sign language motions are analyzed and indicate she is in a happy mood. Based on this analysis, no action is needed, and no treatment is given.

The treatments listed in FIG. 10 should not construed as limiting, as other treatments may be beneficial depending on various scenarios.

Workflow for Weighing Various Inputs when Outputting a Predicted Mood

Figure 11:
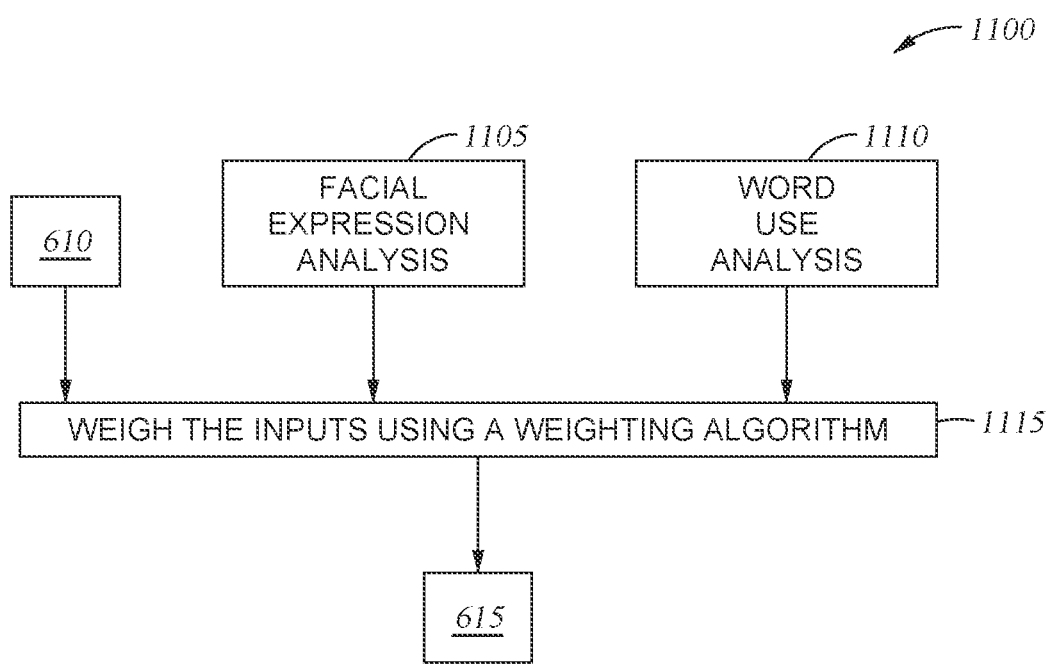
FIG. 11 is an example workflow for weighing various inputs in outputting a predicted mood, according to one embodiment.

FIG. 11 is an example workflow for weighing various inputs when outputting a predicted mood. The workflow 1100 of FIG. 11 is one way of further predicting a mood of an individual using a combination of sentiment detection techniques.

Current techniques exist for monitoring individuals' facial expressions to determine their mood. Additionally, there are techniques for monitoring an individuals' word use to determine their moods. These current techniques may be used in conjunction with sign language sentiment analysis in order to predict the mood of an individual.

Any of the following may be inputted into a weighting algorithm: monitored sign language motions from block 610, facial expression analysis 1105, and word use analysis 1110. To provide a weighted input, at least two of the inputs are used. For example, a computing system may perform two, or all three, of the sentiment analysis techniques corresponding to blocks 610, 1105, and 1110.

At block 1115, the inputs are weighed using a weighting algorithm. This weighting algorithm is pre-configured to weight the inputs. For example, the words used by the monitored individual may be associated with a sad mood. However, the facial expressions used by the monitored individual may be associated with a happy mood. Additionally, the motions used by the monitored individual may be associated with being in pain. The weighting algorithm can account for these types of scenarios where the different outputs of the sentiment analysis techniques do not match as expected. That is, the weighting algorithm can select which of the predictions to trust more. Or the weighting algorithm may determine if two of the three sentiment techniques match. The weighting algorithm can balance between the inputs and predict a mood of a monitored individual.

After the weighting algorithm is applied, the workflow moves to block 615 of FIG. 6, where a predicted mood is outputted. Thus, the predicted mood can be a weighted combination of multiple different sentiment analysis techniques.

Flow Diagram Illustrating a Method for Recalibrating a System Due to a Conflict

Figure 12:
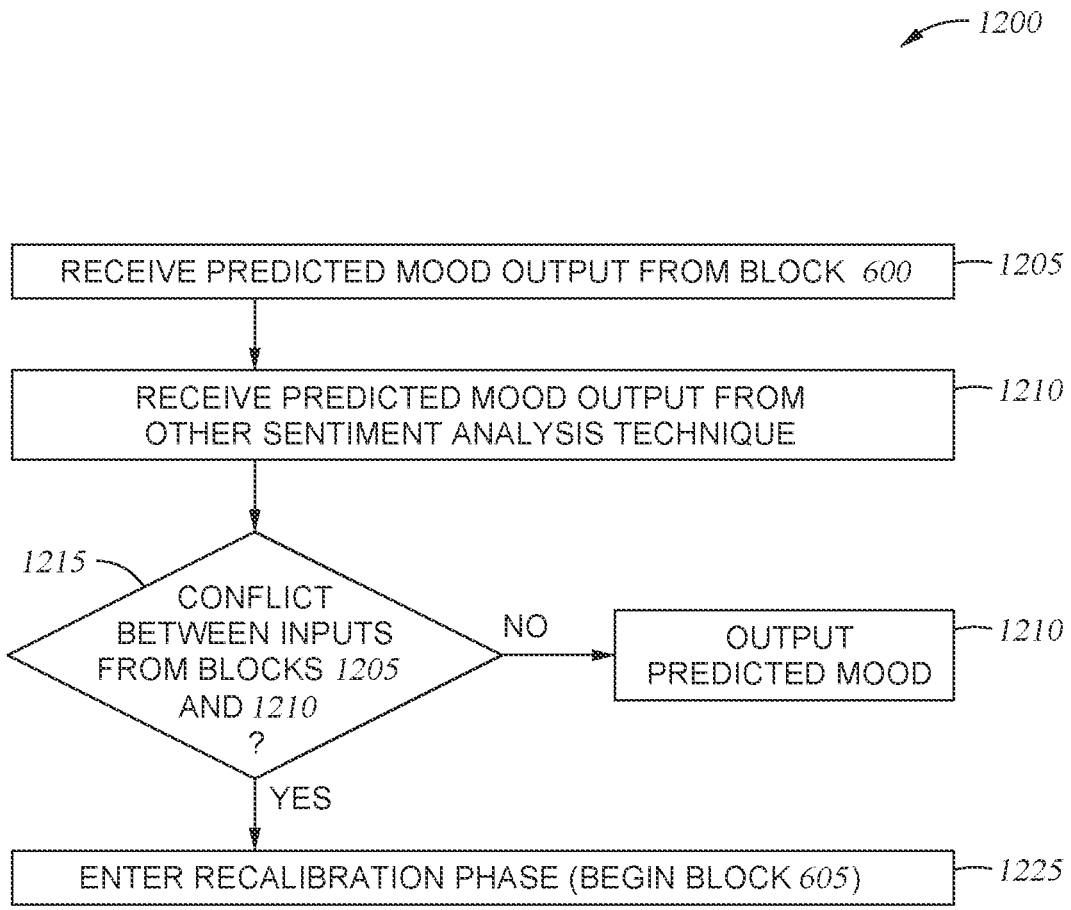
FIG. 12 is a flow diagram for recalibrating a system due to a conflict, according to one embodiment.

FIG. 12 is a flow diagram illustrating a method for recalibrating a system due to a conflict. For example, when using multiple different sentiment analysis techniques, the techniques may output vastly different moods, indicating that one of the techniques is not calibrated properly. For example, the individual who is signing may use sign language motions that are different from the members in the test group used to train the ML model. The types of motion made by the individual when the individual is happy may instead by the types of motions most hearing impaired people make when they are anxious. This can result in the ML model outputting results that do not match with the moods predicted by other sentiment analysis techniques.

Method 1200 begins at block 1205. At block 1205, the computing system receives the predicted mood output from method 600 of FIG. 6. At block 1210, the computing system receives a predicted mood output from a different sentiment analysis technique. This can be the mood predicted by facial expression analysis or word use analysis (or both) as shown in FIG. 11. At 1215, the computing system determines whether there is a conflict between the inputs received at blocks 1205 and 1210. For example, the mood output from method 600 could be that the individual is sad, while the mood output from the other sentiment analysis technique could be that the individual is happy. Because there is a conflict, there may be an issue with the trained ML model used in method 600.

The computing system may recalibrate the ML model after there are a minimum number of conflicts. For example, if there is a conflict between the predicted moods once, but all other times the techniques output similar moods, then the computing system may not recalibrate the ML model. However, if the predicted moods conflict more than a threshold number of times (e.g., more than 40%), then the computing system can decide to recalibrate.

To solve the issues, at block 1225 the machine learning model may be recalibrated during a recalibration phase. This can entail retraining the ML model which can be done using block 605 in FIG. 6 and the methods described in FIGS. 7-9.

For example, if the ML model was trained using a trained group, the computing system may instead request the individual to retrain the ML model using the method 800 where the motions of the individual are used to train the model. That is, the computing system can enter into a training phase where the individual reports their mood and then video data is captured of the individual performing sign language motions when in that mood. Thus, the ML model can be trained using the specific motions and moods experienced by the individual whose moods are then predicted using the ML model, which may improve accuracy. As a result, the number of conflicts between the different sentiment analysis techniques may be reduced, which can result in more accurate mood prediction.

However, there may be no conflict. For example, the mood output from method 600 could be that the individual is happy, and the mood output from the other sentiment analysis techniques can match (or be similar, such as "content" or "pleased"). When this occurs, the method moves to block 1220, where the predicted mood is outputted.

Example Computing Hardware

Figure 13:
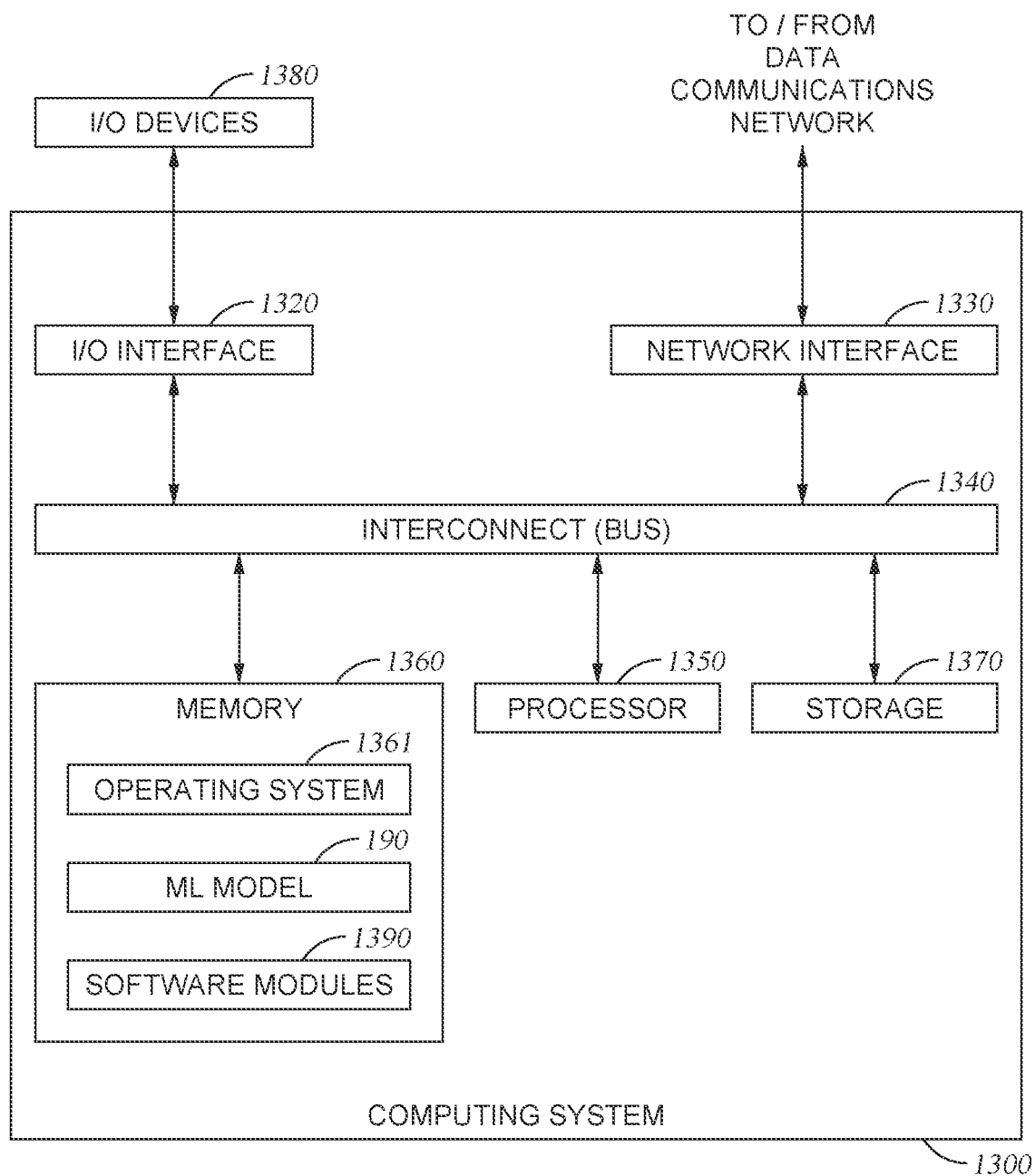
FIG. 13 is a computing system, according to one embodiment.

FIG. 13 illustrates a computing system 1300, which may be used as the user devices in FIG. 1 or to execute the ML model 190, or any other computing device described in the present disclosure. As shown, the computing system 1300 includes, without limitation, a computer processor 1350 (e.g., a central processing unit), a network interface 1330, and memory 1360. The computing system 1300 may also include an input/output (I/O) device interface 1320 connecting I/O devices 1380 (e.g., keyboard, display and mouse devices) to the computing system 1300.

The processor 1350 retrieves and executes programming instructions stored in the memory 1360 (e.g., a non-transitory computer readable medium). Similarly, the processor 1350 stores and retrieves application data residing in the memory 1360. An interconnect 1340 facilitates transmission, such as of programming instructions and application data, between the processor 1350, I/O device interface 1320, storage 1370, network interface 1330, and memory 1360. The processor 1350 is included to be representative of a single processor, multiple processors, a single processor having multiple processing cores, and the like. And the memory 1360 and the storage 1370 are generally included to be representative of volatile and non-volatile memory elements. For example, the memory 1360 and the storage 1370 can include random access memory and a disk drive storage device. Although shown as a single unit, the memory 1360 or the storage 1370 may be a combination of fixed and/or removable storage devices, such as magnetic disk drives, flash drives, removable memory cards or optical storage, network attached storage (NAS), or a storage area-network (SAN). The storage 1370 may include both local storage devices and remote storage devices accessible via the network interface 1330. The ML model 190 is maintained in the memory 1360 to perform sentiment analysis on sign language motions as described above. Additionally, one or more software modules 1390 may be maintained in the memory to perform the functions of training applications, video applications, video processing applications, or services discussed above.

Further, the computing system 1300 is included to be representative of a physical computing system as well as virtual machine instances hosted on a set of underlying physical computing systems. Further still, although shown as a single computing device, one of ordinary skill in the art will recognize that the components of the computing system 1300 shown in FIG. 13 may be distributed across multiple computing systems connected by a data communications network.

As shown, the memory 1360 includes an operating system 1361. The operating system 1361 may facilitate receiving input from and providing output to various components. In one example, the network interface 1330 can be used to output the mood predicted by the ML model 190 to external devices, such as devices used by healthcare professionals.

Additional Considerations

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

Clause 1: A method comprising: capturing, using a camera, a video containing a plurality of sign language motions made by a first individual; predicting, using a trained machine learning (ML) model, a mood of the first individual based on characterizing the plurality of sign language motions in the video; and outputting a second mood based on the mood predicted by the trained ML model.

Clause 2: In addition to clause 1, further comprising: predicting, using a first sentiment analysis technique, a mood of the first individual based on other information in the video besides the plurality of sign language motions; and weighting the mood predicted using the trained ML model and the mood predicted using the first sentiment analysis technique to generate the second mood.

Clause 3: In addition to clause 2, further comprising: determining whether there is a conflict between the mood predicted using the trained ML model and the mood predicted using the first sentiment analysis technique; and upon determining there is a conflict, entering a recalibration phase to retrain the ML model.

Clause 4: In addition to clauses 2 or 3, further comprising: predicting, using a second sentiment analysis technique different from the first sentiment analysis technique, a mood of the first individual based on other information besides the plurality of sign language motions; and weighting the mood predicted using the second sentiment analysis technique to generate the second mood.

Clause 5: In addition to clause 4, wherein the first sentiment analysis technique comprises evaluating facial gestures of the first individual and the second sentiment analysis technique comprises analyzing a textual translation of sign language performed by the first individual.

Clause 6: In addition to clauses 1, 2, 3, 4 or 5, wherein characterizing the plurality of sign language motions in the video comprises: identifying a range of motion of the plurality of sign language motions.

Clause 7: In addition to clauses 1, 2, 3, 4, 5, or 6, wherein characterizing the plurality of sign language motions in the video comprises: identifying a speed or acceleration of at least one hand of the first individual when performing the plurality of sign language motions.

Clause 8: In addition to clauses 1, 2, 3, 4, 5, 6, or 7, wherein characterizing the plurality of sign language motions in the video comprises: identifying a rate at which the first individual communicates words or letters using the plurality of sign language motions.

Clause 9: In addition to clause 8, wherein predicting, using the trained ML model, a mood of the first individual based on characterizing the plurality of sign language motions in the video is not performed by analyzing a meaning of the words or letters.

Clause 10: In addition to clauses 1, 2, 3, 4, 5, 6, 7, 8, or 9, further comprising: determining a medical treatment for the first individual in response to the second mood.

Clause 11: In addition to clauses 1, 2, 3, 4, 5, 6, 7, 8, 9, or 10, further comprising, before predicting the mood of the first individual: receiving input indicating a current mood of a second individual; capturing a plurality of sign language motions of the second individual; generating training data based on the current mood and the plurality of sign language motions of the second individual; and training the ML model using the training data.

Clause 12: A system comprising: one or more computer processors; and a memory containing a program which when executed by the one or more computer processors performs an operation, the operation comprising: capturing, using a camera, a video containing a plurality of sign language motions made by a first individual; predicting, using a trained machine learning (ML) model, a mood of the first individual based on characterizing the plurality of sign language motions in the video; and outputting a second mood based on the mood predicted by the trained ML model.

Clause 13: In addition to clause 12, the operation further comprising: predicting, using a first sentiment analysis technique, a mood of the first individual based on other information in the video besides the plurality of sign language motions; and weighting the mood predicted using the trained ML model and the mood predicted using the first sentiment analysis technique to generate the second mood.

Clause 14: In addition to clause 13, the operation further comprising: determining whether there is a conflict between the mood predicted using the trained ML model and the mood predicted using the first sentiment analysis technique; and upon determining there is a conflict, entering a recalibration phase to retrain the ML model.

Clause 15: In addition to clauses 12, 13, or 14, wherein characterizing the plurality of sign language motions in the video comprises at least one of: identifying a range of motion of the plurality of sign language motions, or identifying a speed or acceleration of at least one hand of the first individual when performing the plurality of sign language motions.

Clause 16: A non-transitory computer readable medium comprising instructions to be executed in a processor, the instructions when executed in the processor perform an operation, the operation comprising: capturing, using a camera, a video containing a plurality of sign language motions made by a first individual; predicting, using a trained machine learning (ML) model, a mood of the first individual based on characterizing the plurality of sign language motions in the video; and outputting a second mood based on the mood predicted by the trained ML model.

Clause 17: In addition to clause 16, the operation further comprising: predicting, using a first sentiment analysis technique, a mood of the first individual based on other information in the video besides the plurality of sign language motions; and weighting the mood predicted using the trained ML model and the mood predicted using the first sentiment analysis technique to generate the second mood.

Clause 18: In addition to clause 17, the operation further comprising: determining whether there is a conflict between the mood predicted using the trained ML model and the mood predicted using the first sentiment analysis technique; and upon determining there is a conflict, entering a recalibration phase to retrain the ML model.

Clause 19: In addition to clauses 17 or 18, wherein characterizing the plurality of sign language motions in the video comprises at least one of: identifying a range of motion of the plurality of sign language motions, or identifying a speed or acceleration of at least one hand of the first individual when performing the plurality of sign language motions.

Clause 20: In addition to clauses 17, 18, or 19, the operation further comprising, before predicting the mood of the first individual: receiving input indicating a current mood of a second individual; capturing a plurality of sign language motions of the second individual; generating training data based on the current mood and the plurality of sign language motions of the second individual; and training the ML model using the training data.

What is claimed is:

1. A method, comprising:
   capturing, using a camera, a video containing a plurality of sign language motions made by a first individual;
   predicting, using a trained machine learning (ML) model, a first mood of the first individual based on characterizing the plurality of sign language motions in the video;
   predicting, using a first sentiment analysis technique, a second mood of the first individual based on other information in the video besides the plurality of sign language motions;
   determining there is a conflict between the first mood predicted using the trained ML model and the second mood predicted using the first sentiment analysis technique; and
   retraining, after determining the conflict, the ML model based on an annotated video of the first individual performing a plurality of sign language motions.

2. The method of claim 1, further comprising:
   weighting the first mood predicted using the trained ML model and the second mood predicted using the first sentiment analysis technique to generate a third mood; and
   after retraining the ML model, outputting the third mood.

3. The method of claim 2, further comprising:
   predicting, using a second sentiment analysis technique different from the first sentiment analysis technique, a fourth mood of the first individual based on other information besides the plurality of sign language motions; and
   weighting the fourth mood predicted using the second sentiment analysis technique to generate the third mood.

4. The method of claim 3, wherein the first sentiment analysis technique comprises evaluating facial gestures of the first individual and the second sentiment analysis technique comprises analyzing a textual translation of sign language performed by the first individual.

5. The method of claim 1, wherein characterizing the plurality of sign language motions in the video comprises:
   identifying a range of motion of the plurality of sign language motions.

6. The method of claim 1, wherein characterizing the plurality of sign language motions in the video comprises:
identifying a speed or acceleration of at least one hand of the first individual when performing the plurality of sign language motions.

7. The method of claim 1, wherein characterizing the plurality of sign language motions in the video comprises:
identifying a rate at which the first individual communicates words or letters using the plurality of sign language motions.

8. The method of claim 7, wherein predicting, using the trained ML model, the first mood of the first individual based on characterizing the plurality of sign language motions in the video is not performed by analyzing a meaning of the words or letters.

9. The method of claim 1, further comprising:
determining a medical treatment for the first individual in response to the second mood.

10. The method of claim 1, further comprising, before predicting the first mood of the first individual:
receiving input indicating a current mood of a second individual;
capturing a plurality of sign language motions of the second individual;
generating training data based on the current mood and the plurality of sign language motions of the second individual; and
training the ML model using the training data.

11. A system comprising:
one or more computer processors; and
a memory containing a program which when executed by the one or more computer processors performs an operation, the operation comprising:
capturing, using a camera, a video containing a plurality of sign language motions made by a first individual;
predicting, using a trained machine learning (ML) model, a first mood of the first individual based on characterizing the plurality of sign language motions in the video;
predicting, using a first sentiment analysis technique, a second mood of the first individual based on other information in the video besides the plurality of sign language motions;
determining there is a conflict between the first mood predicted using the trained ML model and the second mood predicted using the first sentiment analysis technique; and
retraining, after determining the conflict, the ML model based on an annotated video of the first individual performing a plurality of sign language motions.

12. The system of claim 11, the operation further comprising:
weighting the first mood predicted using the trained ML model and the second mood predicted using the first sentiment analysis technique to generate a third mood; and
after retraining the ML model, outputting the third mood.

13. The system of claim 11, wherein characterizing the plurality of sign language motions in the video comprises at least one of:
identifying a range of motion of the plurality of sign language motions, or
identifying a speed or acceleration of at least one hand of the first individual when performing the plurality of sign language motions.

14. A non-transitory computer readable medium comprising instructions to be executed in a processor, the instructions when executed in the processor perform an operation, the operation comprising:
capturing, using a camera, a video containing a plurality of sign language motions made by a first individual;
predicting, using a trained machine learning (ML) model, a first mood of the first individual based on characterizing the plurality of sign language motions in the video;
predicting, using a first sentiment analysis technique, a second mood of the first individual based on other information in the video besides the plurality of sign language motions;
determining there is a conflict between the first mood predicted using the trained ML model and the second mood predicted using the first sentiment analysis technique; and
retraining, after determining the conflict, the ML model based on an annotated video of the first individual performing a plurality of sign language motions.

15. The non-transitory computer readable medium of claim 14, the operation further comprising:
weighting the first mood predicted using the trained ML model and the second mood predicted using the first sentiment analysis technique to generate the second a third mood; and
after retraining the ML model, outputting the third mood.

16. The non-transitory computer readable medium of claim 14, wherein characterizing the plurality of sign language motions in the video comprises at least one of
identifying a range of motion of the plurality of sign language motions, or
identifying a speed or acceleration of at least one hand of the first individual when performing the plurality of sign language motions.

17. The non-transitory computer readable medium of claim 14, the operation further comprising, before predicting the first mood of the first individual:
receiving input indicating a current mood of a second individual;
capturing a plurality of sign language motions of the second individual;
generating training data based on the current mood and the plurality of sign language motions of the second individual; and
training the ML model using the training data.

18. The method of claim 1, wherein retraining the ML further comprises:
receiving an input of a third mood from the individual;
capturing, using the camera, a new video containing a plurality of sign language motions made by the first individual while the individual is in the third mood; and
generating retraining data based on the third mood and the plurality of sign language motions in the new video.

19. The system of claim 11, wherein retraining the ML further comprises:
receiving an input of a third mood from the individual;
capturing, using the camera, a new video containing a plurality of sign language motions made by the first individual while the individual is in the third mood; and
generating retraining data based on the third mood and the plurality of sign language motions in the new video.

20. The non-transitory computer readable medium of claim 14, wherein retraining the ML further comprises:
receiving an input of a third mood from the individual;

capturing, using the camera, a new video containing a plurality of sign language motions made by the first individual while the individual is in the third mood; and generating retraining data based on the third mood and the plurality of sign language motions in the new video.

* * * * *